United States Patent [19]
Weinhold

[11] Patent Number: 5,269,264
[45] Date of Patent: Dec. 14, 1993

[54] ENGINE VENTILATION IN AN AUTOMOTIVE VEHICLE

[76] Inventor: Wolfgang P. Weinhold, 5 Learned Pl., Durham, N.C. 27705

[21] Appl. No.: 937,959

[22] Filed: Aug. 28, 1992

[30] Foreign Application Priority Data

Aug. 30, 1991 [EP] European Pat. Off. ......... 91114632.2

[51] Int. Cl.⁵ .................................................. F01P 7/02
[52] U.S. Cl. .............................. 123/41.05; 123/198 E
[58] Field of Search ............... 123/41.04, 41.05, 41.06, 123/41.07, 41.11, 41.49, 198 E; 180/68.1, 69.22

[56] References Cited

U.S. PATENT DOCUMENTS

| | | | |
|---|---|---|---|
| 3,621,822 | 11/1971 | Oster | 123/41.12 |
| 4,114,714 | 9/1978 | Fachbech et al. | 180/68.1 |
| 4,610,326 | 9/1986 | Kirchweger et al. | 123/41.7 |

FOREIGN PATENT DOCUMENTS

0122254A1 10/1984 European Pat. Off. .
3112630 10/1982 Fed. Rep. of Germany ... 123/41.49

Primary Examiner—Noah P. Kamen

[57] ABSTRACT

This invention relates to ventilation of the engine bay and engine in an automotive vehicle and utilizes a hot air channel to conduct hot air emitted by the heat-exchanger and a cold air by-pass channel for supplying unheated fresh air directly to the engine.

10 Claims, 3 Drawing Sheets

FIG. 4
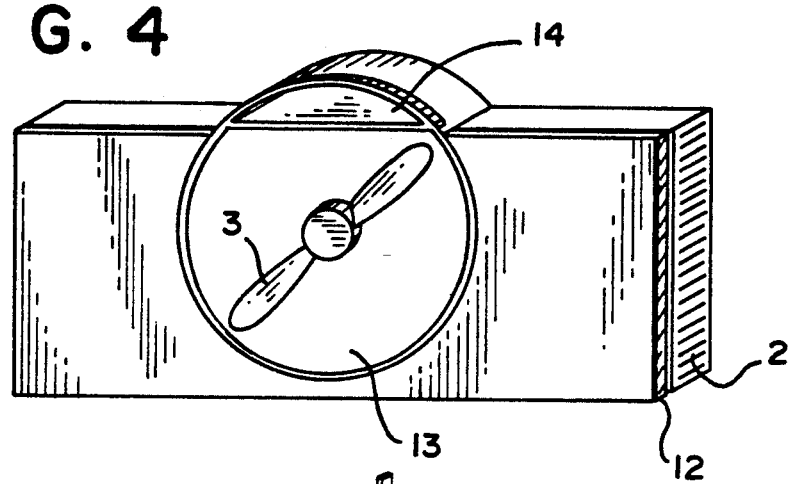
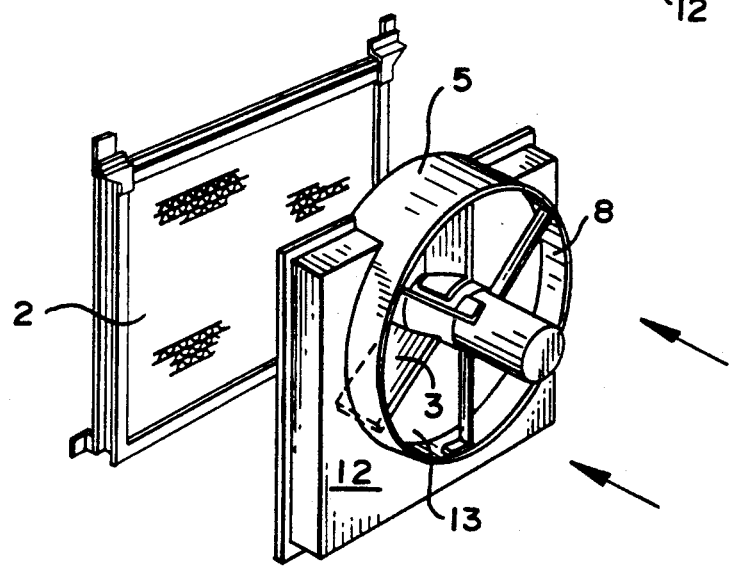
FIG. 5
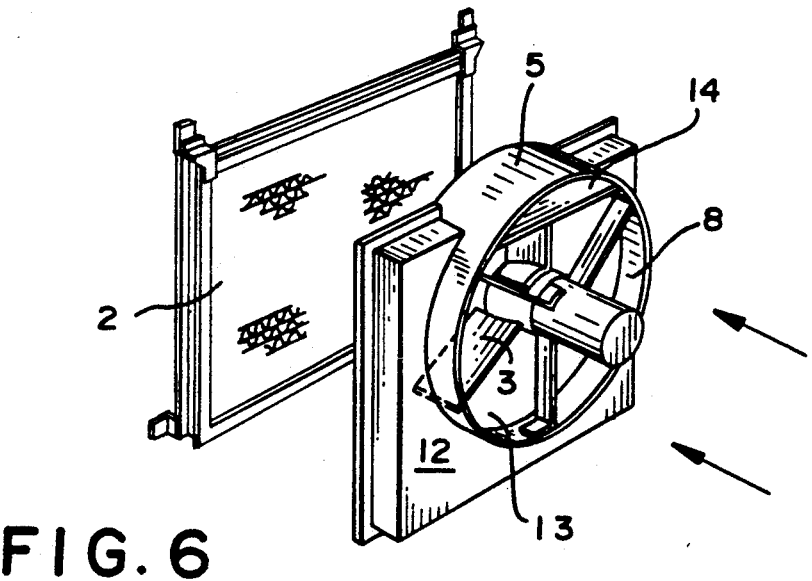
FIG. 6

ENGINE VENTILATION IN AN AUTOMOTIVE VEHICLE

BACKGROUND OF THE INVENTION

This invention relates to the cooling of the engine bay in an automotive vehicle. The closest German art is described in German Patent Number DE-A1-30-15-941 by A. Bauer entitled "Kuehlvorrichtung für eine ein Fahrzeug antreibende Brennkraftmaschine" dated Apr. 25, 1980. Related art is also disclosed in European patent application number EP0122254A1 by Kirchweger, Knopf, and Thien published Oct. 17, 1984 as well as in U.S. Pat. No. 4,114,714, dated Sep. 19, 1978 by Fachbach, Thien, and Grier.

SUMMARY OF THE INVENTION

Provision is made for a hot-air channel to conduct the hot air emitted from the heat-exchanger from the internal combustion engine as well as a separate cold-air bypass channel for supplying unheated fresh air directly to the engine, such provision being made to increase the maximum cold air capacity in a simple and compact design, with ventilation provided from the heat exchanger located in front of the engine and a fresh air intake before the latter.

DESCRIPTION OF THE PRIOR ART

There are many systems in existence for the cooling of engines, but the use of dual-flow air systems is relatively novel. In the ventilation system disclosed in German patent DE-A1-30-15-941, by Bauer and Andreas entitled "Kuehlvorrichtung für eine ein Fahrzeug antreibende Brennkraftmaschine" dated Apr. 25, 1980, a radiator is positioned behind an air intake in the front of the vehicle and a cooling-air bypass is triggered by means of a thermostat-controlled flap. This cooling is effected by a fan located behind the radiator in an air channel through the thermostats between one initial operating position, where the fan vanes basically rotate only behind the radiator, and a second operating position, where the vane movements project into the bypass. On the inlet side the air channel leads directly past the radiator outlet and the outlet of the cooling-air bypass, blockable by a butterfly valve, continuing to lead, on the one hand, into the upper discharge openings in the engine hood on the output side as well as, on the other hand, into an opening blockable by a second butterfly valve to the engine bay accommodating the engine. At relatively low temperatures in the engine bay the first and second butterfly valves are in the closed position and the fan in its initial operating mode, so that the air taken in through the sir intake openings and heated in the heat exchanger is conducted outside through the discharge openings in the engine hood. If the temperature in the engine bay becomes too high, so that, for example, there is the danger of fuel vaporizing, the first and second butterfly valves are opened and the fan moved to its second operating position, so that through the opening previously closed by the second butterfly valve both air heated by the heat exchanger as well as cooling air not heated by the cooling-air bypass are conveyed directly to the engine from the air intake side.

A. Bauer does not disclose means for supplying only cool air to the engine compartment, but rather is restricted to supplying only a mixture of fresh air and hot air from the heat exchanger to the engine bay. Bauer's device does not provide for diverting completely the hot air channel from the engine. In contrast, in the simple and compact design of the present ventilation system the maximum cooling-air capacity in an engine with elevated temperature can be attained, by a hot-air channel behind the heat exchanger separated from the cold-air bypass channel as far as air conduction is concerned so that it is possible to supply the whole ram stream consisting of cold fresh air directly to the engine bay. This is not possible with the apparatus disclosed by A. Bauer Additionally, in the present invention, at least one fan which may preferentially be an axial fan provided as an essentially flat fan is appointed advantageously before the heat exchanger, so that when the fan is operating the fresh cooling air taken in through the fresh-air intake is forced into the subsequent heat exchanger.

In European patent application number EP0122254A1 by Kirchweger, Knopf, and Thien published Oct. 17, 1984 an encapsulated engine bay, and a heat exchanger and fan unit located outside of the encapsulated motor bay are disclosed. Kirchweger, Knopf, and Thien do not, however, disclose any means to control the volume of flow of the fresh air channel and thus the engine is provided with cool fresh air even when the engine is cold. Additionally, no provision is made to control the volume flow of the hot air channel.

In U.S. Pat. No. 4,114,714 Fachbach, Thien, and Grier disclose a sound-supressing engine enclosure which shows a fresh air intake channel which leads the volume flow created by the ram air into an encapsulated engine-gear box box unit. Fachbach, Thien, and Grier do not disclose any means to control the fresh air intake channel in order to provide optimal heat-up of the engine or means to support flow through the heat exchanger in combination with the fresh air channel.

BRIEF DESCRIPTION OF THE DRAWINGS

FIG. 4 The fan and cover wall, segment wall and heat exchanger configuration.

FIG. 5 A three dimensional view of the fan, intake nozzle, cover wall and heat exchanger.

FIG. 6 A three dimensional view of the fan, intake nozzle, and heat exchanger showing also the segment wall.

PREFERRED EMBODIMENT OF THE INVENTION

Figure 1:
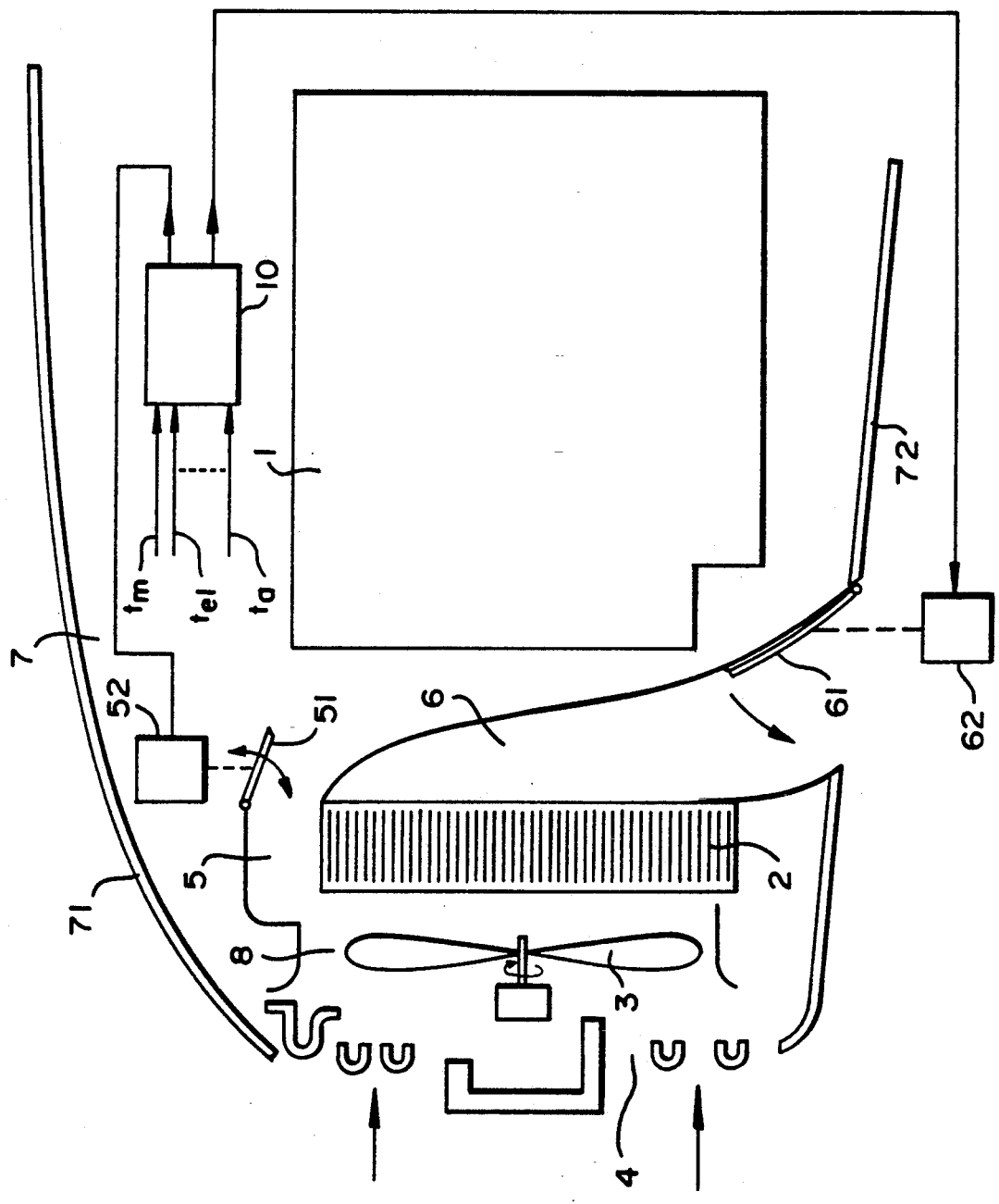
FIG. 1 A longitudinal axial section through an automotive vehicle's engine bay with a control system for the butterfly valves.

In a preferred embodiment of the present invention engine bay 7 of FIG. 1 is bounded above by motor hood 71, below by floor panel 72 and at the front side by fresh-air intake 4. The engine's cooling liquid can be conveyed through heat exchanger 2. Intake nozzle 8 encircles the fan 3. Fan 3 within intake nozzle 8 is located between the left front side of heat exchanger 2 and fresh-air intake 4. This intake nozzle may be a component of a housing for heat exchanger 2, the housing also containing cold-air bypass channel 5, defined to be around heat exchanger 2, and hot-air channel 6. The fan may be driven by an electric motor, whereby said fan may continue in operation after said engine is stopped or the fan may be driven by a hydrodynamic motor.

Both cold-air bypass channel 5 as well as hot-air channel 6 can be closed by a blocking device, particularly flap valves 51 and 61, in such a manner that air does not flow through the particular channel concerned. In particular, valve 51 can serve for blocking fresh-air intake from the cold-air bypass channel to the engine. As a matter of expediency the first flap valves 51 and/or the second flap valves 61 are set with intermediary positions between their final positions via actuators 52 and 62 respectively, this setting being dependent on control device 10 in such a manner that an optimum temperature is set, that is in the sense of optimum consumption and/or exhaust gas values, for engine 1 and, when required, for its auxiliary units; specified as actual values to this end for control device 10 are in particular engine temperature "tm", temperature "tel" of an electronic system installed in the engine bay for cooling as well as outside temperature "ta" of the outside cooling air taken in.

As disclosed in the preferred embodiment it is possible, for example, to cut off an engine compartment encapsulated from the ram air and the cooling air delivered by the fan by closing butterfly valve 51. This will ensure the cold engine will heat up to its operating temperature rapidly. On the other hand, if on the engine being greatly heated flap valves 61 is closed and flap valves 51 opened, this will ensure that all the ram air and/or cold air taken in by the fan through fresh-air intake 4 is pressed into the engine bay via the cold-air bypass channel and can thus be utilized for cooling engine 1 or any electronic equipment disposed in the engine bay. The cooling air is conveyed either by ram pressure incurred at the front of the vehicle and/or by fan 3 installed securely between fresh-air intake 4 and heat exchanger 2, only taking up little space. The cooling air is conveyed to the front side of heat exchanger 2 or the intake or inlet opening of cold-air bypass channel 5 running above heat exchanger 2.

Surprisingly, it has been found that by closing flap valves 61 and opening butterfly valve 51 and running fan 3, which can be an electrically powered axial fan, the total fluid flow forwarded by the fan 3, which is pressed via the cold-air bypass channel in the engine bay, stays constant concerning the driven volume and the pressure rise of the fluid flow. This effect thus gives the advantageous result that maximum cooling flow to the engine bay is still obtained when the vehicle is not in motion or at low or no ram-air contribution at all or even after shut-off of the motor where after cooling of the engine bay is required in order to eliminate the risk of overheating components in the engine bay heated by the still emitting heat of the engine, the muffler, the manifold, the turbocharger, or of the exhaust system. Additionally, the flap valves may be set subordinate to a control device 10 monitoring the operating temperature of the engine.

Figure 2:
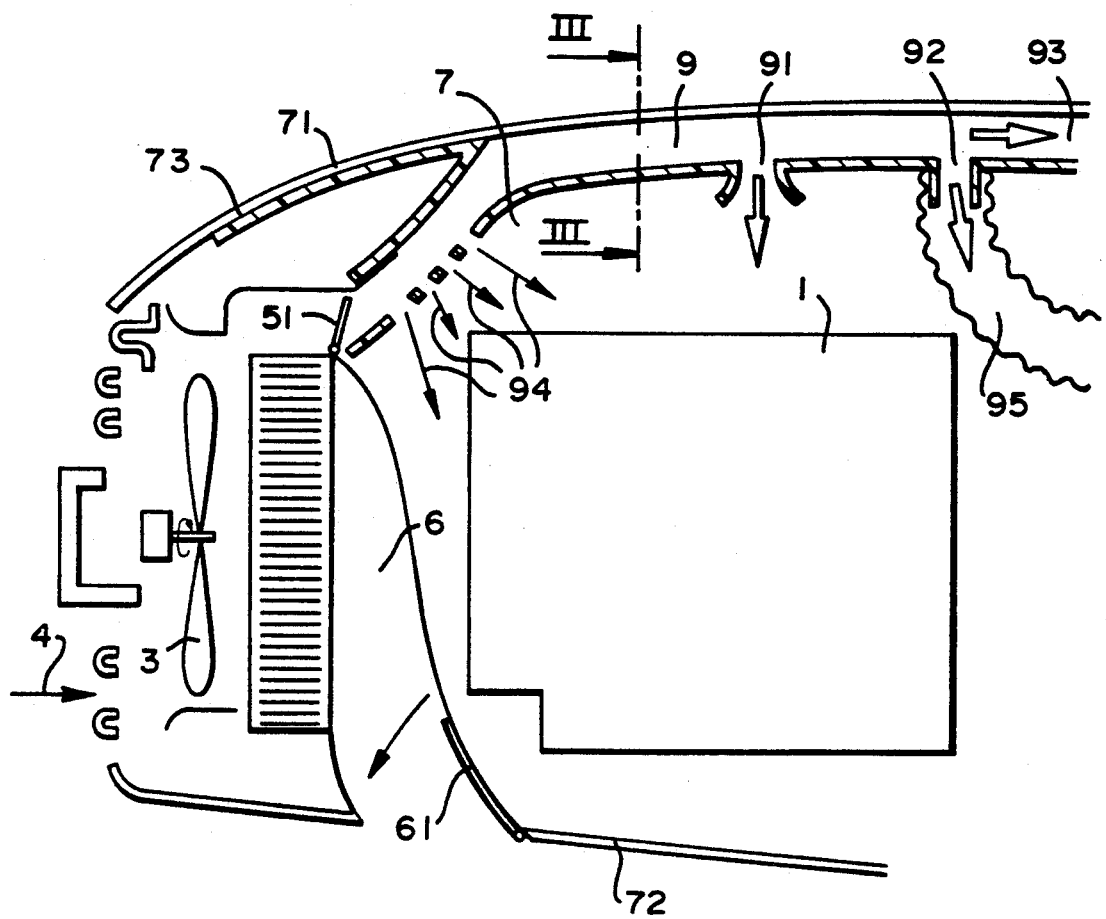
FIG. 2 The engine bay as shown in FIG. 1 with specific cold-air conduction for the engine bay FIG. 3 The configuration as per FIG. 2 in a partial section according to section III—III.
Figure 3:
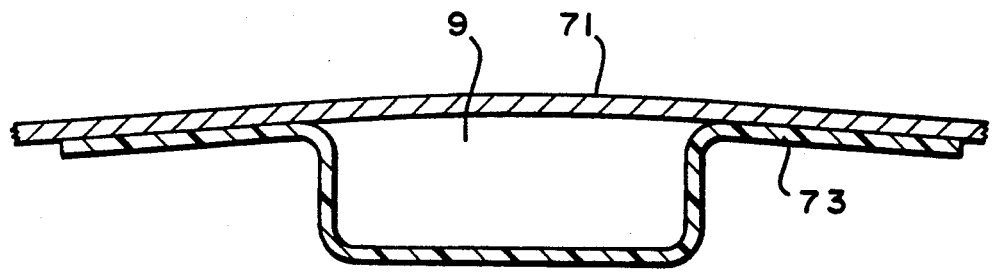

According to FIGS. 2 and 3 some components of the engine as well as some components in the engine bay require increased cooling in order to prevent overheating of these components or to increase the efficiency of these components, therefore provision is made for at least one cooling-air channel 9 leading to engine bay 7 with flow openings 91 directed to areas requiring more cooling air. This cooling-air channel 9 provides also flow openings 92 to which flexible air hose 95 are attached leading cooling air to defined areas. This cooling-air channel 9 provides a flow opening 93 leading cold air, for example to an electronic module on the splash wall below the front window of the vehicle.

A diffuse cooling-air flow for all engine bay 7 diverting from the exit of cold-air bypass channel 5 may occur, for example, directly as a parallel branch to the connection of engine bay cooling-air channel 9 or especially simply—as illustrated in FIG. 2—via input-side diffusion flow openings 94 in the first section of engine bay cooling-air channel 9.

FIG. 4 shows the configuration of the cover wall 12, the intake nozzle area 13, and the segment wall 14. FIG. 5 shows a three dimensional view of the heat exchanger 2 the nozzle 8, which encompasses part of the cold air bypass channel 5, the intake nozzle area 13, and the cover wall 12. FIG. 6 shows additionally the segment wall 14. In a constructively simple, advantageously silencing manner the cold air bypass channel is an integral component of noise suppression in engine bay 7, particularly of noise-silencing lining 73 for engine hood 71. As part of this integral design fresh air can be fed to the engine around the heat-exchanger by way of a cold air bypass channel formed by the elongation of the inlet nozzle 11 of the fan 3 and an outer part of the heat exchanger, this heat exchanger being structurally separated from the cold-air bypass channel, and the fan sweeping also through the cold-air bypass, thereby providing improved intake conditions for the cold-air bypass and the heat-exchanger. Furthermore, the heating of a cold engine is accelerated by the prevention of cooling flow in an engine bay by closing of the cold-air bypass valve, thereby enabling an optimum working temperature of the engine to be reached whereby the production of toxic fumes from the engine is decreased and the efficiency of the engine is increased, the closing of the valve being automatically controlled. Air flow conditions are found to be greatly improved if an area between the heat exchanger and the fresh air intake is covered by a cover hood having an opening defined by the intake nozzle as shown in FIG. 4. The intake nozzle may be formed by a plain ring for ease in manufacturing. As shown in FIG. 5 the cover hood substantially covers the area of the heat exchanger but is in front of the heat exchanger by a distance which may be from 0.5 centimeters to 10 centimeters. As shown in FIG. 6 the segment wall 14 divides nozzle area 13 into regions that are directed either to the heat exchanger or the the cool air bypass 5 and gives an exit only to the heat exchanger and to the cold air bypass channel. The presence of the cover hood in front of the heat exchanger forces the distribution of air across the heat exchanger to be substantially uniform, thus surprisingly increasing the heat dissipation efficiency of the heat exchanger The presence of the segment wall 14 divides the flow of fresh air so that a portion of the flow driven by the fan 3 is directed towards the cool air bypass channel 5.

I claim:

1. A ventilation system for an engine in an automotive vehicle with a heat-exchanger between said engine and a fresh-air intake, said fresh-air intake fresh air conducted away from said engine via a hot-air channel containing a valve, after said fresh air flows through said heat exchanger, said ventilation system containing a fan between said heat exchanger and said fresh air intake whereby said fresh air is fed to said engine around said heat-exchanger by way of a cold air bypass channel formed by the elongation of an inlet nozzle of said fan and an outer part of said heat exchanger, said heat exchanger being structurally separated from said cold-air bypass channel, said fan sweeping through said cold-air bypass channel, thereby providing improved intake conditions for said cold-air bypass and said heat-exchanger.

2. A ventilation system as disclosed in claim 1 wherein said intake nozzle is formed by a plain ring.

3. A ventilation system for an engine in an automotive vehicle with a heat exchanger between said engine and a fresh-air intake from which cooling air can be conducted past said engine by way of a cold-air bypass channel, said ventilation system having a hot-air channel behind said heat exchanger, said hot-air channel being structurally separated from said cold-air bypass channel, said ventilation system provided with at least one valve for blocking hot-air from said hot-air channel.

4. A ventilation system as disclosed in claim 3 wherein said valve is set subordinate to a control device monitoring the operating temperature of said engine.

5. A ventilation system as disclosed in claim 3 wherein said ventilation system is provided with at least one fan located adjacent said heat exchanger.

6. A ventilation system as disclosed in claim 5 wherein said fan is driven by an electric motor.

7. A ventilation system as disclosed in claim 5 wherein said fan is driven by a hydrodynamic motor.

8. A ventilation system as disclosed in claim 5 whereby said fan is in operation after said engine is stopped by means of a control device.

9. A ventilation system for an engine in an automotive vehicle with a heat exchanger between said engine and a fresh-air intake from which cooling air can be conducted past said engine by way of a cold-air bypass channel around said heat exchanger, said ventilation system having a hot-air channel behind said heat exchanger, said hot-air channel being structurally separated from said cold-air bypass channel, said ventilation system is provided with an engine bay cooling-air channel formed by the engine hood itself and by a noise-absorbing cover of the engine hood said bay cooling-air channel communicating with said bypass channel.

10. A ventilation system for an engine in an automotive vehicle with a heat exchanger between said engine and a fresh-air intake nozzle from which cooling air can be conducted past said engine by way of a cold-air bypass channel around said heat exchanger, said ventilation system having a hot-air channel behind said heat exchanger, said hot-air channel being structurally separated from said cold-air bypass channel, wherein said heat exchanger and said fresh air intake is closed by a cover-hood which has at least one opening formed by said intake nozzle and defines atleast in part said bypass channel.

* * * * *